US012687686B2

(12) United States Patent
Nagasaki et al.

(10) Patent No.: US 12,687,686 B2
(45) Date of Patent: Jul. 21, 2026

(54) OPTICAL CONNECTOR MODULE, OPTICAL COUPLING STRUCTURE, CONNECTING MEMBER, AND CONNECTING METHOD

(71) Applicant: SUMITOMO ELECTRIC INDUSTRIES, LTD., Osaka (JP)

(72) Inventors: Taisuke Nagasaki, Osaka (JP); Takeshi Inoue, Osaka (JP); Kensaku Shimada, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 256 days.

(21) Appl. No.: 18/324,483

(22) Filed: May 26, 2023

(65) Prior Publication Data

US 2023/0384544 A1     Nov. 30, 2023

(30) Foreign Application Priority Data

May 31, 2022     (JP) ................................. 2022-088999

(51) Int. Cl.
  *H04B 10/00*     (2013.01)
  *G02B 6/38*     (2006.01)
  *G02B 6/42*     (2006.01)

(52) U.S. Cl.
  CPC ......... *G02B 6/4292* (2013.01); *G02B 6/3831* (2013.01); *G02B 6/3897* (2013.01)

(58) Field of Classification Search
  CPC .. G02B 6/4292; G02B 6/3831; G02B 6/3897; G02B 6/3885; G02B 6/4214; G02B 6/3821; G02B 6/3835; G02B 6/3847
  See application file for complete search history.

(56) References Cited

U.S. PATENT DOCUMENTS

| | | | | |
|---|---|---|---|---|
| 7,182,522 B2 * | 2/2007 | Sasaki | ................. | G02B 6/3825 |
| | | | | 385/53 |
| 7,404,680 B2 * | 7/2008 | Ono | .................... | G02B 6/4231 |
| | | | | 385/52 |
| 8,678,667 B2 * | 3/2014 | Koreeda | ............. | G02B 6/3882 |
| | | | | 385/59 |
| 9,453,975 B2 * | 9/2016 | Akieda | ................ | G02B 6/3821 |
| 9,645,327 B2 * | 5/2017 | Isenhour | ............. | G02B 6/3897 |
| 10,488,599 B2 * | 11/2019 | Gniadek | ............. | G02B 6/3825 |
| 10,551,579 B2 * | 2/2020 | Lian | .................... | G02B 6/3893 |
| 10,591,689 B2 * | 3/2020 | Zhang | ................. | G02B 6/3825 |

(Continued)

FOREIGN PATENT DOCUMENTS

| | | |
|---|---|---|
| JP | 2005-181419 A | 7/2005 |
| JP | 2013-140200 A | 7/2013 |
| WO | 2013/099700 A1 | 7/2013 |

*Primary Examiner* — Agustin Bello

(74) *Attorney, Agent, or Firm* — Oliff PLC

(57) ABSTRACT

An optical connector module connected to an optical component is disclosed. The optical connector includes at least one optical fiber, a connector that holds the optical fiber, the connector being configured to be connected to the optical component in a first direction, and a connecting member configured to maintain a connected state between the connector and the optical component when the connector is connected to the optical component. The connecting member is configured to rotate in contact with the connector and to be engaged with each of the connector and the optical component.

19 Claims, 15 Drawing Sheets

(56)　　　　References Cited

U.S. PATENT DOCUMENTS

| | | | | |
|---|---|---|---|---|
| 11,280,968 | B2* | 3/2022 | Janta-Polczynski | ......................... G02B 6/3829 |
| 12,078,848 | B2* | 9/2024 | Wang | ................... G02B 6/3879 |
| 12,164,159 | B2* | 12/2024 | Taha | .................... G02B 6/4228 |
| 2005/0220420 | A1 | 10/2005 | Sasaki et al. | |
| 2007/0258683 | A1* | 11/2007 | Rolston | .................... G02B 6/43 385/88 |
| 2008/0226228 | A1* | 9/2008 | Tamura | ................ G02B 6/4214 385/33 |
| 2009/0245736 | A1* | 10/2009 | Ahadian | .............. G02B 6/4292 385/92 |
| 2013/0216190 | A1* | 8/2013 | Haley | ................... G02B 6/423 385/79 |
| 2014/0086541 | A1 | 3/2014 | Arao | |
| 2015/0346435 | A1* | 12/2015 | Kato | .................... G02B 6/3885 385/78 |
| 2015/0355419 | A1* | 12/2015 | Isenhour | ................. B29C 33/42 425/150 |
| 2016/0091670 | A1* | 3/2016 | Akieda | ................ G02B 6/4284 385/78 |
| 2016/0356962 | A1* | 12/2016 | Moriyama | ............. G02B 6/387 |
| 2017/0023749 | A1 | 1/2017 | Douma et al. | |
| 2017/0192181 | A1* | 7/2017 | Barwicz | ............. G02B 6/4292 |
| 2018/0356601 | A1* | 12/2018 | Gniadek | .............. G02B 6/3825 |
| 2020/0012056 | A1* | 1/2020 | Lian | ..................... G02B 6/4292 |
| 2021/0263236 | A1* | 8/2021 | Janta-Polczynski | ......................... G02B 6/3885 |
| 2022/0019031 | A1* | 1/2022 | Wang | ................... G02B 6/3897 |
| 2022/0283388 | A1 | 9/2022 | Nagasaki et al. | |
| 2023/0333329 | A1* | 10/2023 | Tanaka | .................... G02B 6/368 |
| 2023/0384544 | A1* | 11/2023 | Nagasaki | ............. G02B 6/3885 |
| 2023/0393355 | A1* | 12/2023 | Zbinden | .............. G02B 6/4278 |
| 2024/0045152 | A1* | 2/2024 | Tanaka | ................ G02B 6/3861 |
| 2024/0272378 | A1* | 8/2024 | Hirose | .................... G02B 6/40 |
| 2024/0402438 | A1* | 12/2024 | Kanno | ................ G02B 6/3871 |
| 2024/0411088 | A1* | 12/2024 | Kanno | .................... G02B 6/38 |

* cited by examiner

OPTICAL CONNECTOR MODULE, OPTICAL COUPLING STRUCTURE, CONNECTING MEMBER, AND CONNECTING METHOD

CROSS-REFERENCE TO RELATED APPLICATION

This application claims the benefit of priority from Japanese Patent Application No. 2022-088999, filed on May 31, 2022, the entire contents of which are incorporated herein by reference.

TECHNICAL FIELD

The present disclosure relates to an optical connector module, an optical coupling structure, a connecting member, and a connecting method.

BACKGROUND

JP2013-140200A discloses an optical module having a configuration in which a connector component that holds a plurality of optical fibers is connected to a lens array component.

SUMMARY

One aspect of the present disclosure provides an optical connector module coupled to an optical component. The optical connector module includes at least one optical fiber, a connector that holds the optical fiber, the connector being configured to be connected to the optical component in a first direction, and a connecting member configured to maintain a connected state between the connector and the optical component when the connector is connected to the optical component. The connecting member is configured to rotate in contact with the connector and to be engaged with each of the connector and the optical component.

BRIEF DESCRIPTION OF THE DRAWINGS

FIG. 5.

DETAILED DESCRIPTION

Figure 1:
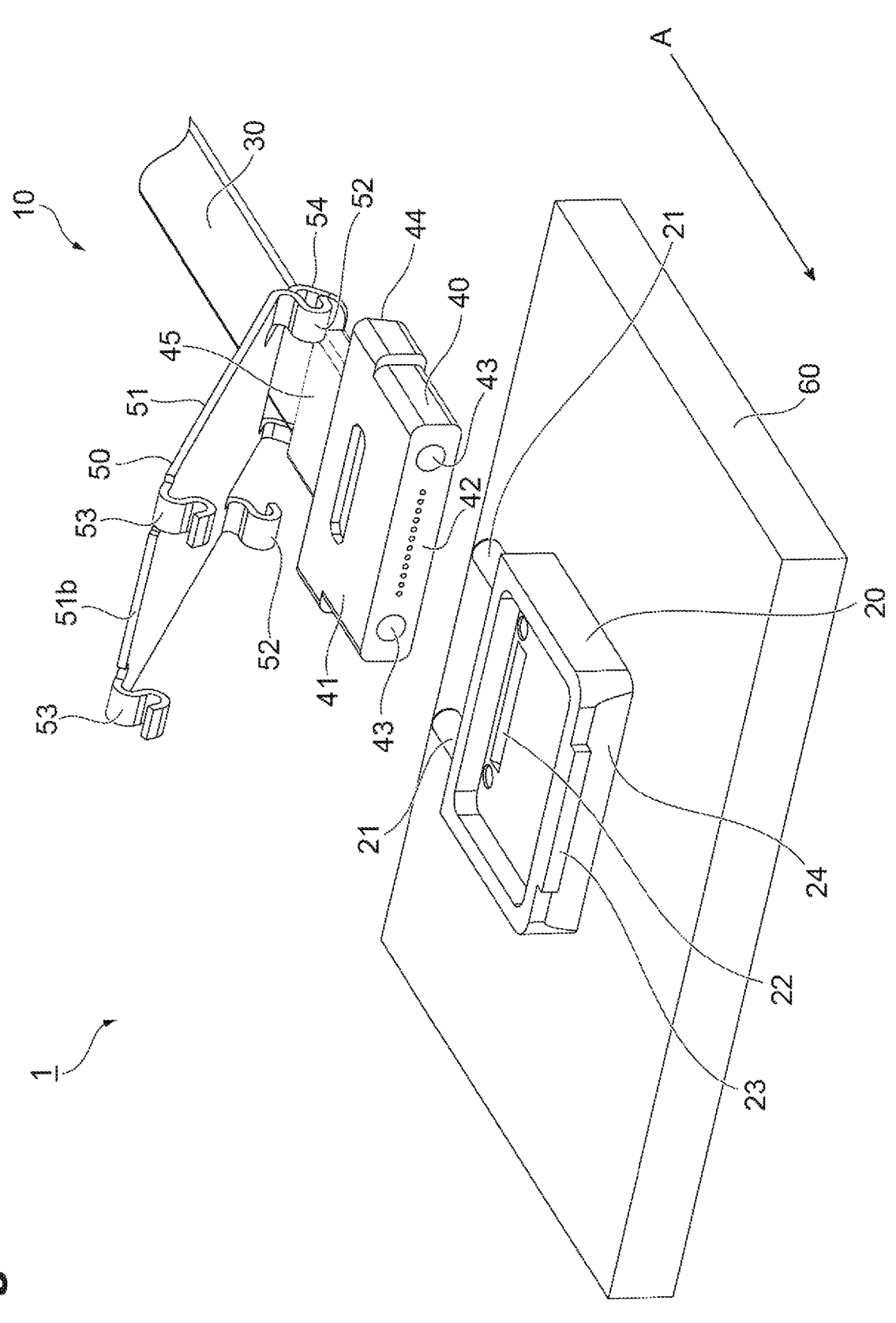
FIG. 1 is a perspective view of an optical coupling structure according to a first embodiment, illustrating a state before an optical connector module is connected to a lens module.

Problems to be Solved by the Present Disclosure

In the optical module disclosed in JP2013-140200A, a connecting state between the connector component and the lens array component is maintained by a fitting spring having a flat plate and two pairs of engaging walls that extend vertically from both ends of the flat plate. When the fitting spring is fitted to a connected body composed of the connector component and the lens array component, it is necessary to attach the two pairs of engaging walls, that is, four engaging walls, to the connected body substantially simultaneously. Thus, such attaching can be cumbersome work.

Effects of the Present Disclosure

According to the present disclosure, a connecting member can be easily attached to a connected body of a connector and an optical component.

Description of Embodiments of the Present Disclosure

First, the contents of the embodiments of the present disclosure will be listed and described. An optical connector module according to an embodiment of the present disclosure is an optical connector module coupled with an optical component. The optical connector includes at least one optical fiber, a connector that holds the optical fiber and is configured to be connectable to an optical component in a first direction, and a connecting member that maintains a connected state between the connector and the optical component when the connector is connected to the optical component. The connecting member is configured to rotate in contact with the connector and to be engaged with each of the connector and the optical component.

In this optical connector module, the connecting member is configured to rotate in contact with the connector and to be engaged with each of the connector and the optical component. When the connecting member is attached to a connected body of the connector and the optical component in this embodiment, the connecting member first comes into contact with the connector due to a rotation operation. Thus, this embodiment can avoid attaching the connecting member to both the connector and the optical component simultaneously, and the connecting member can be more easily attached to the connector and the optical component. Moreover, if the connecting member is attached to both the connector and the optical component simultaneously, a force that pushes the connecting member tends to be strong, which may deform the connecting member. However, according to the optical connector module, the connecting member is attached in order, and thus, the deformation of the connecting member can be curbed. The optical component may be, for example, a lens module including a lens, or a connector (for example, an MT connector, or the like) that holds at least one optical fiber, and is not particularly limited.

In the above optical connector module, the connecting member may include a first plate portion, a first elastic portion provided at a first end of the first plate portion and engageable with the connector, and a second elastic portion provided at a second end opposite to the first end of the first plate portion and engageable with the optical component. The first elastic portion may include a first protruding portion that protrudes toward the second end and may be configured to apply an elastic force toward the second end to the first protruding portion when the first protruding portion is engaged with the connector. Thus, the connecting member can be more reliably engaged with the connector and the optical component and can rotate the connecting member around a region close to the first elastic portion.

In the optical connector module described above, the second elastic portion may include a second protruding portion that protrudes toward the first end and may be configured to apply an elastic force toward the first end to the second protruding portion when the second protruding portion is engaged with the optical component. Thus, the second elastic portion can be more reliably engaged with the optical component.

In the optical connector module described above, the connecting member may include a second plate portion that extends further rearward from the first end of the first plate portion, and the second plate portion may include a rotation axis for the rotation operation of the connecting member. With such a configuration, engaging the connecting member with each of the connector and the optical component and rotating the connecting member can be performed as a series of operations, and it is possible to more easily attach the connecting member to the connected body of the connector and the optical component.

In the optical connector module described above, the connecting member may be configured so that, due to the rotation operation around the rotation axis, the second elastic portion comes into contact with the optical component after the first elastic portion comes into contact with the connector, and the first elastic portion and the second elastic portion are engaged with the connector and the optical component, respectively. In this embodiment, the connecting member can be smoothly attached to the connected body of the connector and the optical component.

In the optical connector module described above, an opening may be formed in the second plate portion, and the optical fiber may be inserted through the opening. In this embodiment, the connecting member is attached to the optical fiber, and thus it is possible to prevent the connecting member from coining off.

In the optical connector module described above, the second plate portion may include a first flat plate portion that extends in the first direction and a second flat plate portion that extends from the first flat plate portion in a direction intersecting the first direction, and the opening may be formed over the first flat plate portion and the second flat plate portion. In this embodiment, it is possible to easily set a desired rotation operation of the connecting member by adjusting a length of the first flat plate portion and a size or shape of the opening.

In the optical connector module described above, the first elastic portion may include a pair of first elastic structures each including a first protruding portion, and the second plate portion may extend rearward from between the pair of first elastic structures. In this embodiment, it is possible to prevent interference between an operation of the first protruding portion in contact with the connector during the rotation operation and an operation of the second plate portion that serves as the rotation axis, and the rotation operation of the connecting member can be smoothly performed. Thus, the connecting member can be more easily attached to the connected body of the connector and the optical component.

In the optical connector module described above, the connecting member may be configured so that the first plate portion covers at least part of the optical component when the connector is maintained in a state in which it is connected to the optical component. Thus, it is possible to curb deterioration of the optical characteristics of the optical coupling structure caused by foreign matter adhering to a region (for example, a mirror surface or a lens surface) in the optical component to which foreign matter should not adhere.

In the optical connector module described above, a surface of a rear end of the connector may be a first inclined surface that is inclined toward the inside of the connector, and the first inclined surface may form an angle of 5 to 30 degrees with respect to a plane orthogonal to the first direction. In this embodiment, it is possible to prevent the connecting member engaged with the connector from unintentionally coining off due to an external impact.

The optical connector module may further include a boot that is attached to the connector and protects the optical fiber, and a rotation support that is provided on the boot and rotatably supports the connecting member. In this embodiment, since the rotation support is provided on the boot, the connecting member can be easily removed when the connecting member is replaced, or the like.

An optical coupling structure according to an embodiment of the present disclosure includes any one of the optical connector modules described above and an optical component coupled with the optical connector module. According to this optical coupling structure, when the connecting member is attached to the connected body of the connector and the optical component, the connecting member first comes into contact with the connector due to a rotation operation. Thus, this embodiment avoids attaching the connecting member to both the connector and the optical component simultaneously, and the connecting member can be more easily attached to the connector and the optical component. Further, according to the optical coupling structure, the connecting member is attached in order, and thus, deformation of the connecting member can be curbed.

In the optical coupling structure described above, a surface of a rear end of the optical component may be a second inclined surface that is inclined toward the inside of the optical component, and the second inclined surface may form an angle of 5 to 30 degrees with respect to a plane orthogonal to a first direction. In this embodiment, it is possible to prevent the connecting member engaged with the optical component from unintentionally coining off due to an external impact.

A connecting member according to an embodiment of the present disclosure is a connecting member for attaching a connector to an optical component. The connecting member includes a first plate portion, a first elastic portion provided at a first end of the first plate portion and engageable with the connector, a second elastic portion provided at a second end opposite to the first end of the first plate portion and engageable with the optical component, and a second plate portion that extends from the first end of the first plate portion. The first elastic portion includes a first protruding portion that protrudes toward the second end, and the first protruding portion is configured to apply an elastic force toward the second end. The second elastic portion includes a second protruding portion that protrudes toward the first end, and the second protruding portion is configured to apply an elastic force toward the first end.

A method according to an embodiment of the present disclosure is a method for connecting a connector to an optical component. The method includes preparing the connecting member, rotating the connecting member around a rotation axis on a second plate so that a first protruding portion comes into contact with the connector, further rotating the connecting member around the rotation axis until a second protruding portion comes into contact with the optical component after the first protruding portion comes into contact with the connector, and engaging a first elastic portion with the connector and engaging a second elastic portion with the optical component. With such a connecting method, due to the rotation operation, the second protruding portion of the connecting member comes into contact with the optical component after the first protruding portion of the connecting member comes into contact with the connector, and thus the connecting member is engaged with the connector and the optical component. Thus, this embodiment avoids attaching the connecting member to both the connector and the optical component simultaneously, and the connecting member can be more easily attached to the connector and the optical component. Moreover, according to the connecting method, the connecting member is attached in order, and thus, deformation of the connecting members can be curbed.

Details of the Embodiment of the Present Disclosure

Specific examples of the embodiment of the present disclosure will be described below with reference to the drawings. The present invention is not limited to these examples, but is indicated by the scope of the claims, and is intended to include all modifications within the meaning and scope of equivalents to the scope of the claims. In the description of the drawings, the same elements are denoted by the same reference numerals, and overlapping descriptions thereof will be omitted.

First Embodiment

Figure 2:
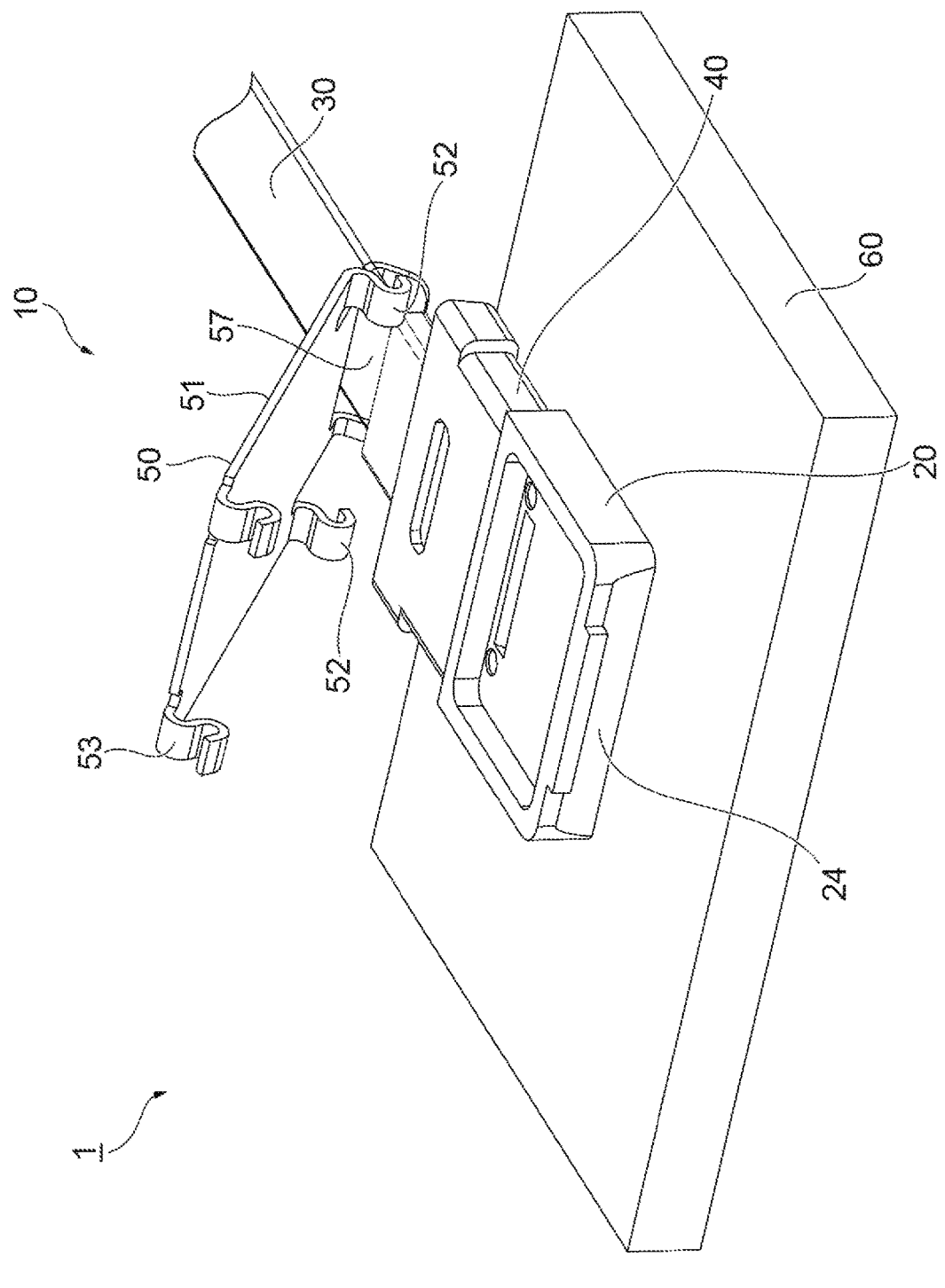
FIG. 2 is a perspective view illustrating a state after the optical connector module is connected to the lens module in the optical coupling structure shown in FIG. 1.

FIGS. 1 and 2 are perspective views illustrating an optical coupling structure according to a first embodiment. As shown in FIGS. 1 and 2, the optical coupling structure 1 includes an optical connector module 10 and a lens module 20 (an optical component). The optical connector module 10 includes a ribbon fiber cable 30 having a plurality of optical fibers, a connector 40 that holds each of the optical fibers of the ribbon fiber cable 30, a boot 45 attached to the connector 40, and a connecting member 50 for maintaining a state in which the connector 40 is connected to the lens module 20. The lens module 20 is mounted on a substrate for example. In such an optical coupling structure 1, the optical connector module 10 is moved to the lens module 20 in a connection direction A (a first direction) and connected to the lens module 20.

The lens module 20 is an optical component configured to be optically coupled to a tip end of each of the optical fibers of the ribbon fiber cable 30 held by the optical connector module 10. The lens module 20 receives an optical signal transmitted by each of the optical fibers of the ribbon fiber cable 30 and causes each light receiving element (not shown) provided on the substrate 60 to receive each optical signal. When each light emitting element (not shown) is provided on the substrate 60, the lens module 20 inputs the optical signal from the light-emitting element to each of the optical fibers of the ribbon fiber cable 30.

The lens module 20 includes a pair of guide pins 21, a mirror surface 22, a rear end protrusion 23 and a rear end surface 24. Alignment in the optical coupling between the optical connector module (the connector 40) and the lens module 20 is performed by inserting the pair of guide pins 21 into the pair of guide holes 43 of the connector 40. The mirror surface 22 is an optical structure for reflecting the optical signal received from each of the optical fibers of the ribbon fiber cable 30 and propagating in the connection direction A at 90 degrees toward the light receiving element mounted on the substrate 60. When the light emitting element is provided on the substrate 60, the mirror surface 22 reflects the optical signal propagating in a vertical direction from the light emitting elements toward the optical connector module 10 by 90 degrees.

The rear end protrusion 23 is a protrusion that protrudes from a rear end of the lens module 20. The rear end protrusion 23 functions as positioning when the pair of second elastic portions 53 of the connecting member 50 are engaged with the lens module 20 the lens module 20 of which details will be described below. The rear end surface 24 is an end surface located at the rear end of the lens module 20, and includes an inclined surface (a second inclined surface) inclined toward the inside of the lens module 20 with respect to a plane orthogonal to the connection direction A. An angle formed by the inclined surface of the rear end surface 24 with respect to the plane orthogonal to the connection direction A may be, for example, in the range of 5 to 30 degrees, or may be in the range of 10 to 15 degrees. Since the inclined surface of the rear end surface 24 has such an inclination angle, once the second elastic portions 53 of the connecting member 50 are engaged with the rear end surface 24, it is difficult for the connecting member 50 to come off.

The ribbon fiber cable 30 is an optical fiber member in which a plurality of optical fibers extending in the connection direction A are disposed in order in a width direction orthogonal to the connection direction A and entirely covered with a coating resin or the like. Although the number of optical fibers included in the ribbon fiber cable is not particularly limited, it may be twelve, eighteen, or twenty-four, for example. The ribbon fiber cable 30 is configured so that a tip end portion of each of the optical fibers is inserted into the connector 40 and held, and a tip end surface of each fiber is exposed from a front end surface 42 of the connector 40.

The connector 40 is an optical component configured to hold each of the optical fibers of the ribbon fiber cable 30 and to be connectable in the connection direction A to the lens module 20. The connector 40 is, for example, an MT connector. The connector 40 includes a connector main body 41, a front end surface 42, a pair of guide holes 43 and a rear end surface 44. The connector main body 41 is a resin member having a substantially rectangular parallelepiped shape. The connector main body 41 is provided with an internal space from the rear end surface 44 toward the front end surface 42 and is configured so that the tip end of each of the optical fibers of the ribbon fiber cable 30 inserted from the rear end surface 44 is exposed from the front end surface 42.

The guide holes 43 are positioning holes provided to sandwich the optical fibers exposed on the front end surface 42 and extend inside the connector main body 41 in the connection direction A. When the optical connector module 10 (the connector 40) is connected to the lens module 20, the optical connector module 10 is positioned with respect to the lens module 20 by inserting the pair of guide pins 21 of the lens module 20 into the pair of guide holes 43. The rear end surface 44 is an end surface located at the rear end of the connector 40 and includes an inclined surface (a first inclined surface) that is inclined toward the inside of the connector 40 with respect to the plane orthogonal to the connection direction A. An angle formed by the inclined surface of the rear end surface 44 with respect to the plane orthogonal to the connection direction A may be, for example, in a range of 5 to 30 degrees, or may be in a range of 10 to 15 degrees. Since the inclined surface of the rear end surface 44 has such an inclination angle, once the first elastic portions 52 of the connecting member 50 is engaged with the rear end surface 44, it is difficult for the connecting member 50 to come off.

Figure 3:
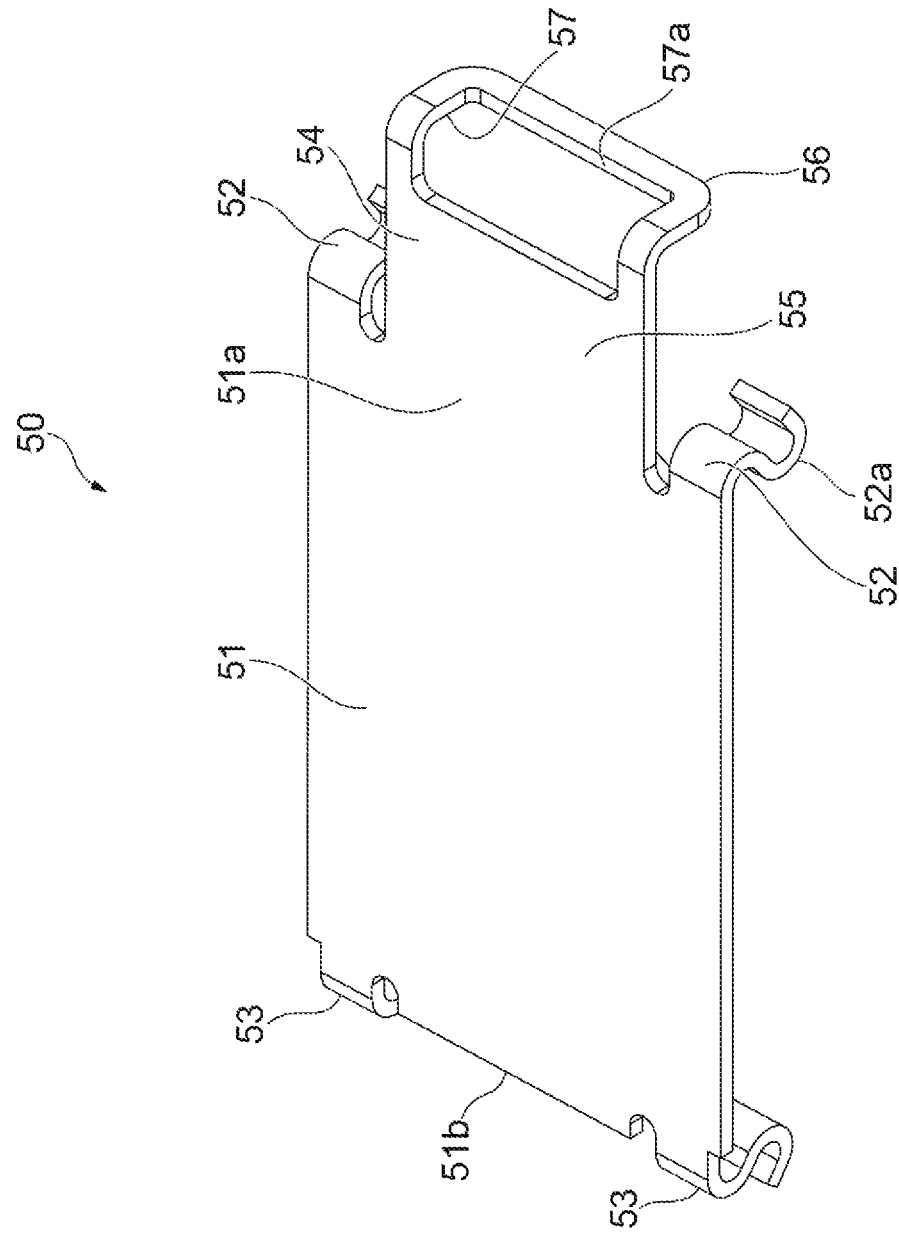
FIG. 3 is a perspective view of a connecting member of the optical connector module shown in FIG. 1 when seen from above.
Figure 4:
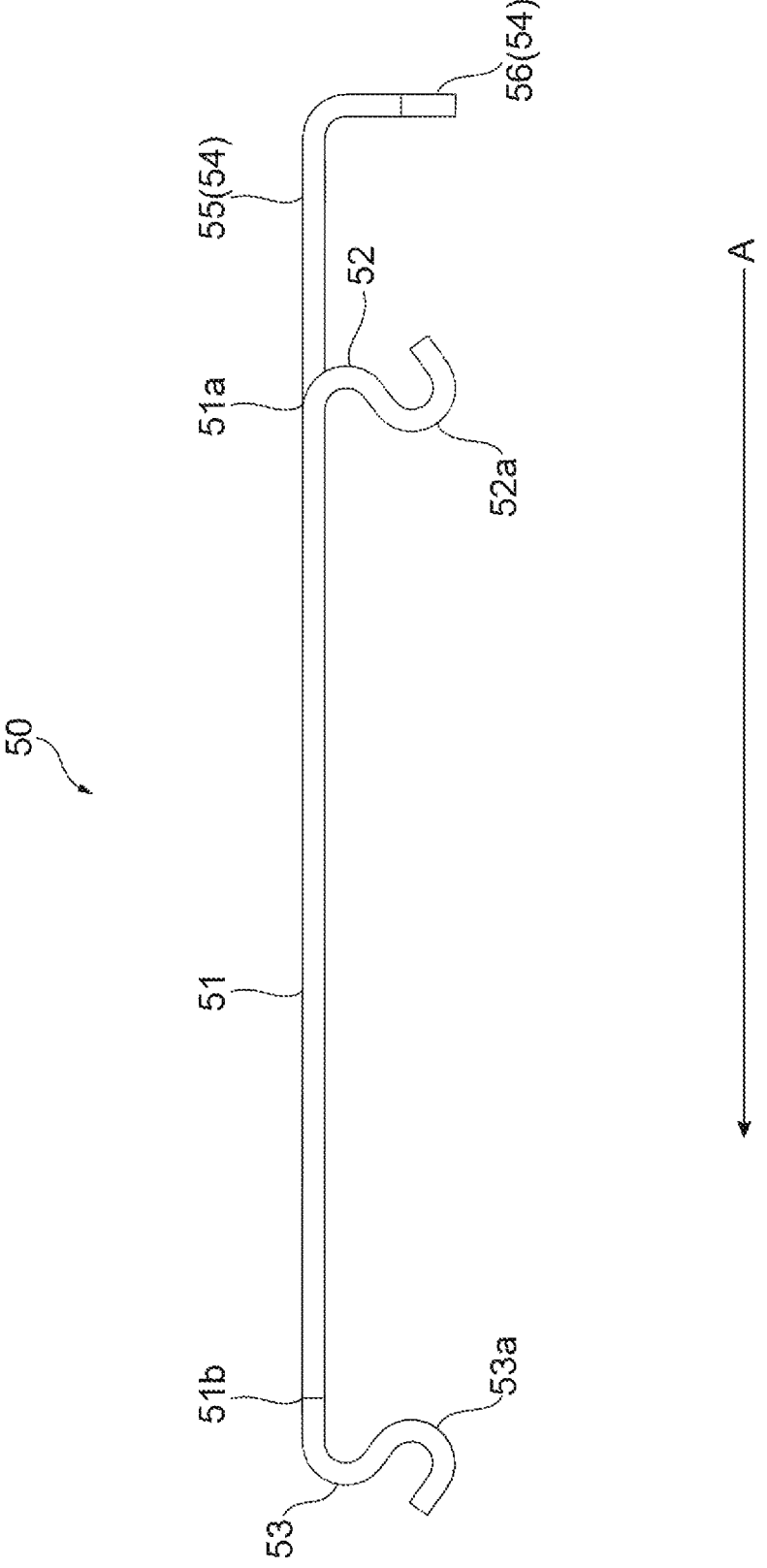
FIG. 4 is a side view of the connecting member shown in FIG. 3 when seen from the side.

The connecting member 50 is a member that maintains a connected state between the connector 40 and the lens module 20 when the connector 40 is connected to the lens module 20. The connecting member 50 is configured to maintain the connected state such that the rear end of the connector 40 and the rear end of the lens module 20 are sandwiched and pressed against each other (refer to FIG. 10). FIG. 3 is a perspective view of the connecting member when seen from above. FIG. 4 is a side view of the connecting member when seen from the side.

The connecting member 50 includes a first plate portion 51, a pair of first elastic portions 52, a pair of second elastic portions 53, and a second plate portion 54, as shown in FIGS. 3 and 4. The connecting member 50 is made of a metal, for example, but may be made of other materials such as a resin. The first plate portion 51 is a substantially rectangular plate portion extending in the connection direction A and has a first end 51a and a second end 51b opposite to the first end 51a. Each of the first elastic portions 52 is an elastic structure that is provided at a corner portion of the first end 51a of the first plate portion 51 and can be engaged with the connector 40. Each of the second elastic portions 53 is an elastic structure that is provided at a corner portion of the second end 51b of the first plate portion 51 and can be engaged with the lens module 20. The second plate portion 54 is a member that extends further rearward (to the right in FIG. 3) from a central region of the first end 51a of the first plate portion 51, and has an L shape in a side view. The second plate portion 54 extends rearward from a central region between the pair of first elastic portions 52.

Each of the first elastic portions 52 includes a first protruding portion 52a protruding toward the second end 51b, and is configured to apply an elastic force toward the second end 51b to the first protruding portion 52a when the first protruding portions 52a are engaged with the connector 40. Each of the first elastic portions 52 has, for example, an S shape in a side view. Each of the second elastic portions 53 includes a second protruding portion 53a protruding toward the first end 51a and is configured to apply an elastic force toward the first end 51a to the second protruding portion 53a when the second protruding portions 53a are engaged with the rear end surface 24 of the lens module 20. Each of the second elastic portions 53 has, for example, an S shape in a side view.

The second plate portion 54 includes a first flat plate portion 55 that extends from the first plate portion 51 in the connection direction A, and a second flat plate portion 56 that extends from the rear end of the first flat plate portion 55 in the vertical direction orthogonal to the connection direction A. An opening 57 that extends over the first flat plate portion 55 and the second flat plate portion 56 is formed in the second plate portion 54. There is an edge 57a of the opening at a lower end of the opening 57. When the connecting member 50 is attached, as shown in FIG. 2, the ribbon fiber cable 30 is inserted through the opening 57 so that a lower portion of the ribbon fiber cable 30 comes into contact with the edge 57a. The connecting member 50 is configured to perform a rotation operation around a place at which the edge 57a of the opening 57 comes into contact with the ribbon fiber cable 30. In other words, the second plate portion 54 includes a rotation axis C in the rotation operation of the connecting member 50.

Here, a method of connecting and coupling the optical connector module 10 to the lens module 20, and a configuration for performing the rotation operation when coupling will be described, with reference to FIGS. 5 to 10. FIGS. 5 to 10 are diagrams sequentially illustrating the method of connecting and coupling the optical connector module 10 to the lens module 20.

Figure 5:
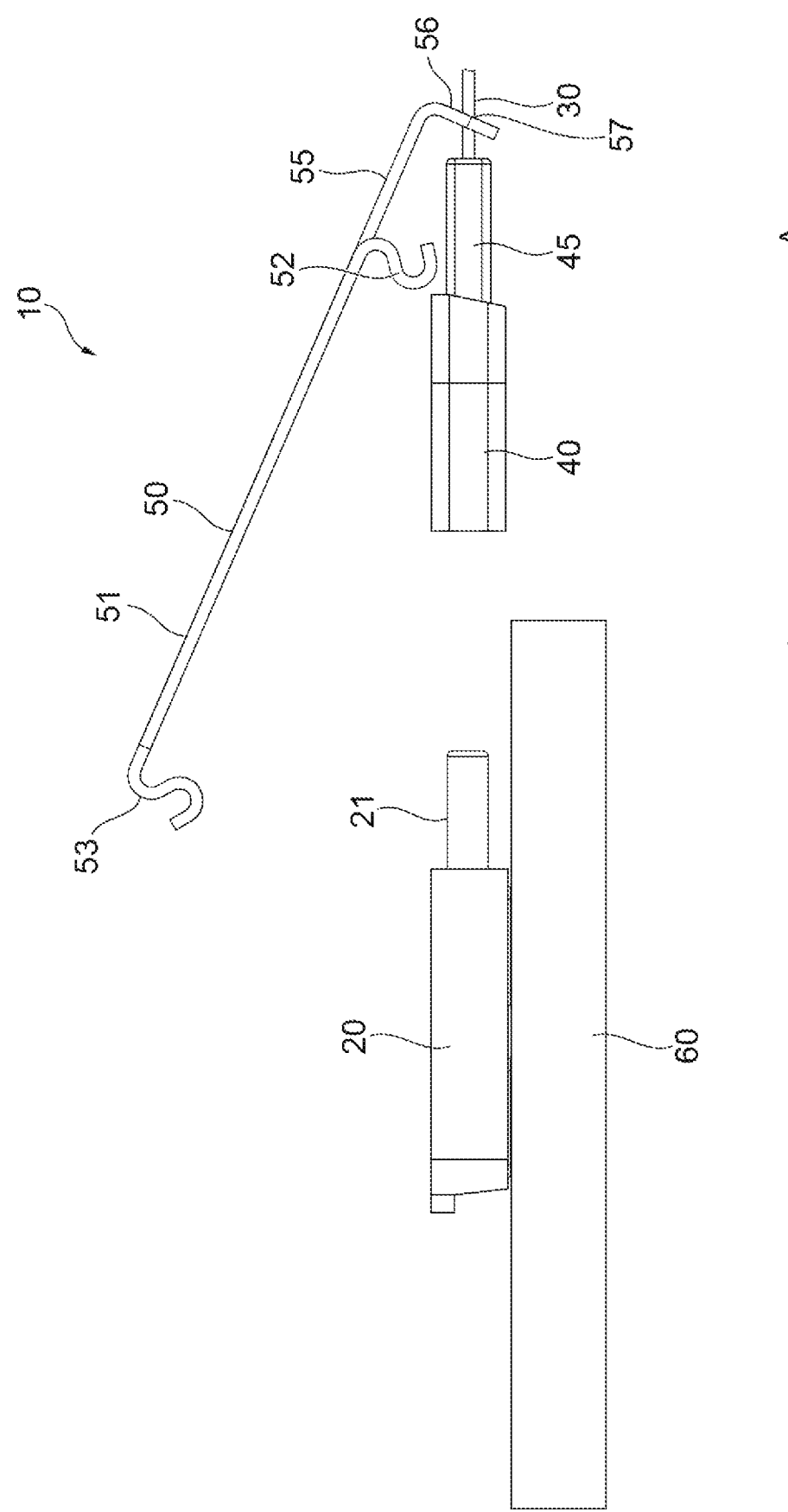
FIG. 5 is a diagram sequentially illustrating a method of connecting the optical connector module to the lens module.

As shown in FIG. 5, the connecting member 50 is attached to the connector 40 in a state in which the ribbon fiber cable 30 is inserted through the opening 57, in the optical connector module 10. Moreover, the connecting member 50 is set to be inclined so that the pair of first protruding portions 52a are located near the rear end surface 44 of the connector 40 and the pair of second protruding portions 53a are located obliquely above the pair of first protruding portions 52a. When the preparation of the optical connector module 10 and the lens module 20 having such configurations is completed, the optical connector module is moved in the connection direction A toward the lens module 20 mounted on the substrate 60 to connect the optical connector module 10 to the lens module 20. Then, the guide pins 21 of the lens module 20 are inserted into the guide holes 43 of the optical connector module 10 to connect the optical connector module 10 to the lens module 20.

Figure 6:
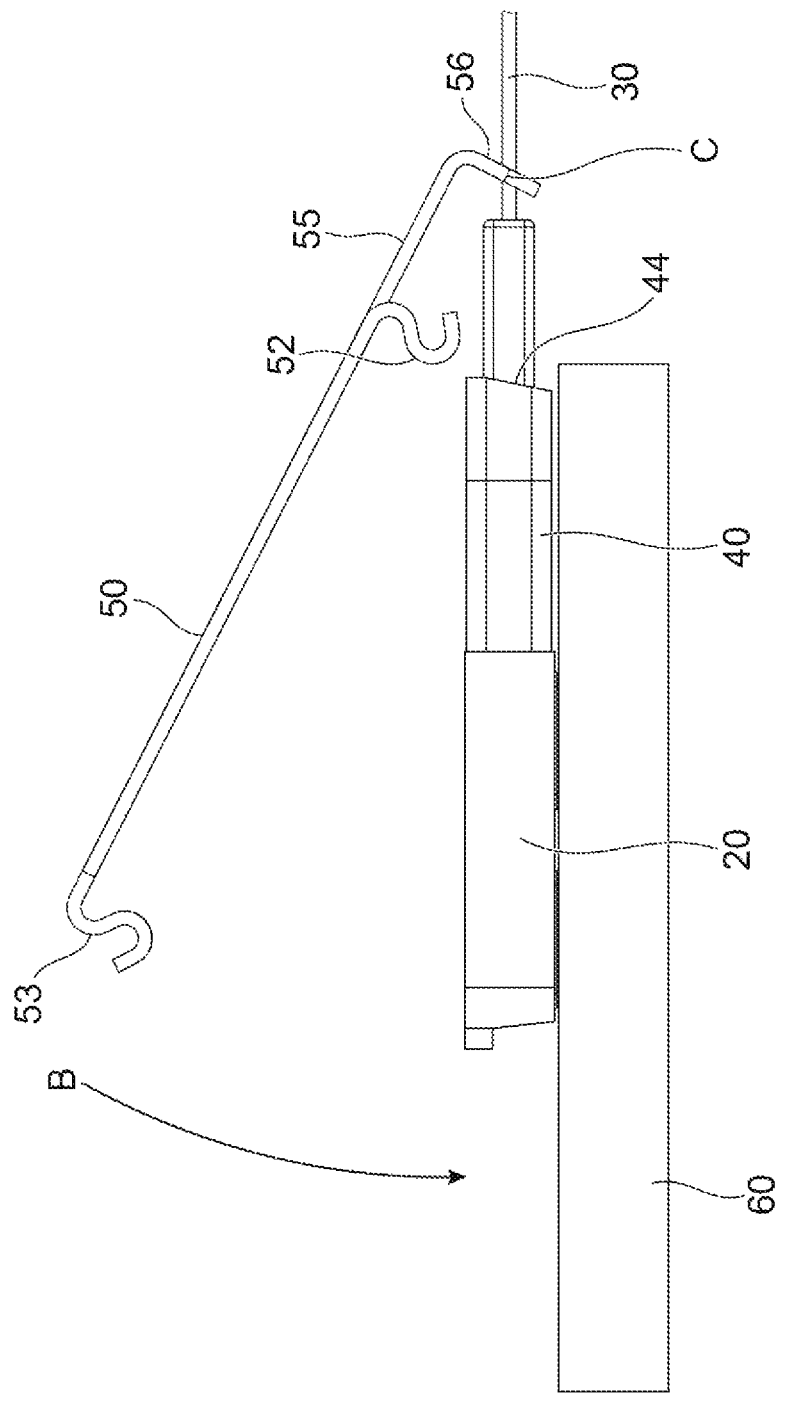
FIG. 6 is a diagram sequentially illustrating the method of connecting the optical connector module to the lens module following
Figure 7:
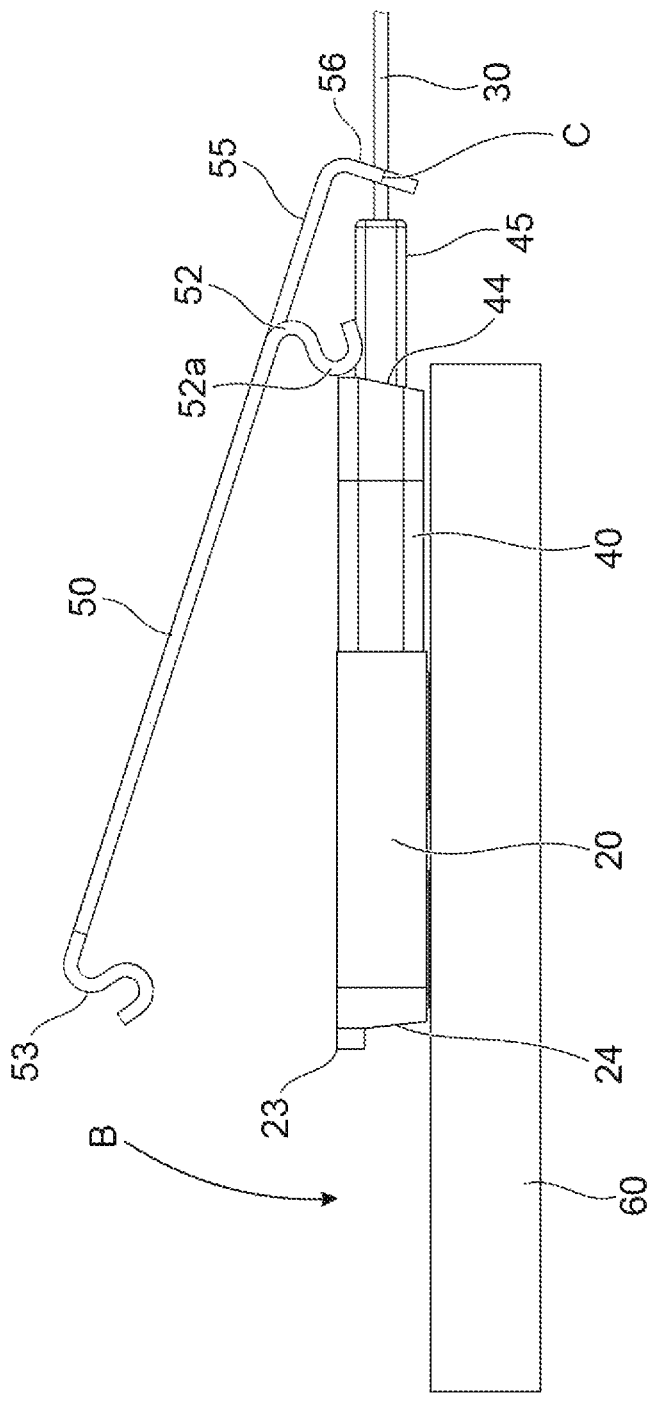
FIG. 7 is a diagram sequentially illustrating the method of connecting the optical connector module to the lens module following FIG. 6.
Figure 8:
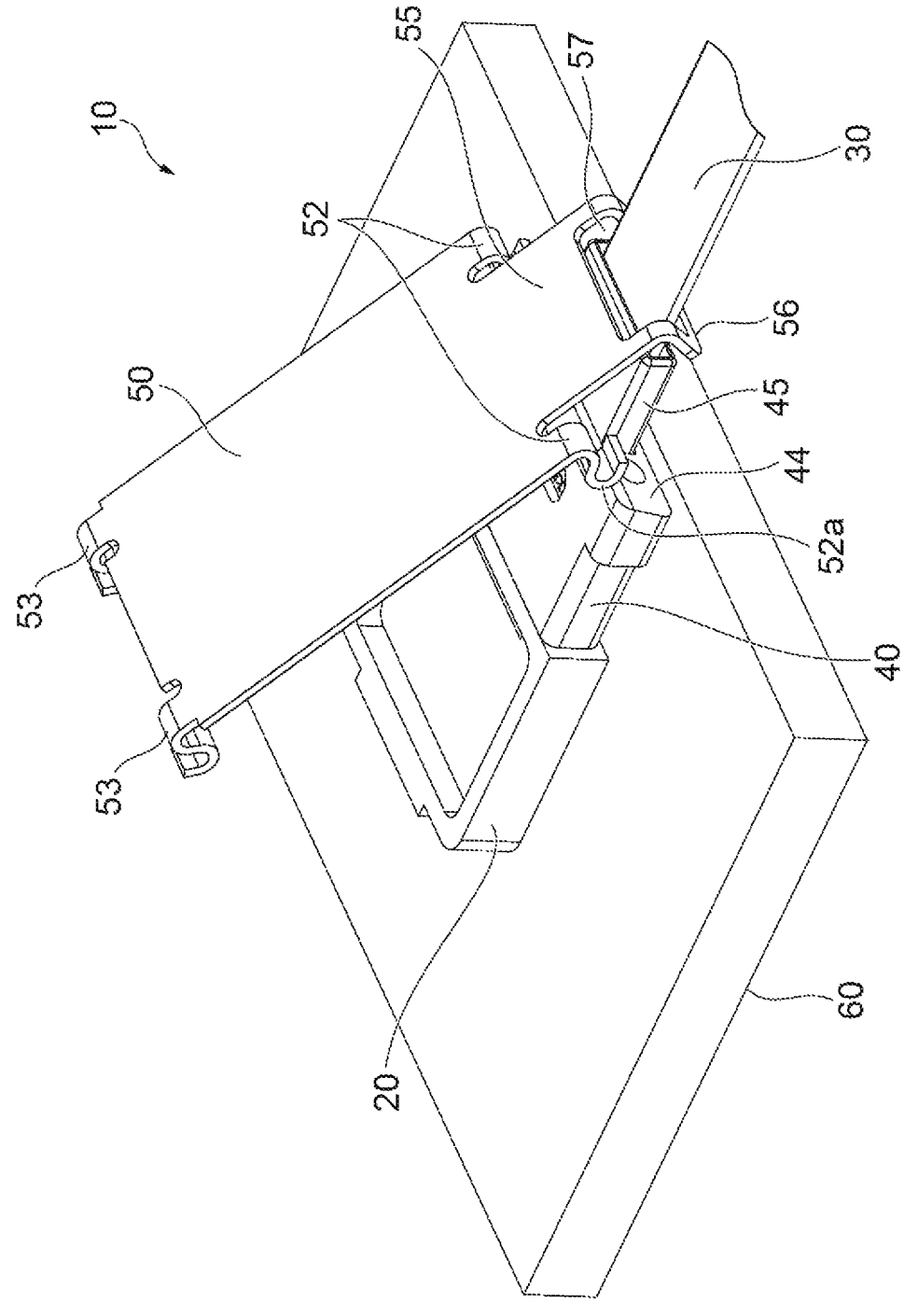
FIG. 8 is a rear perspective view of the optical connector module and the lens module shown in FIG. 7.

Subsequently, when the optical connector module 10 is connected to the lens module 20, the connecting member 50 of the optical connector module 10 is rotated around the rotation axis C in a rotation direction B as shown in FIG. 6. Due to the rotation, the first protruding portions 52a of the first elastic portions 52 of the connecting member 50 first come into contact with an upper portion of the rear end surface 44 of the connector 40, as shown in FIGS. 7 and 8. At this time, the second elastic portions 53 of the connecting member 50 are not in contact with the lens module 20.

Figure 9:
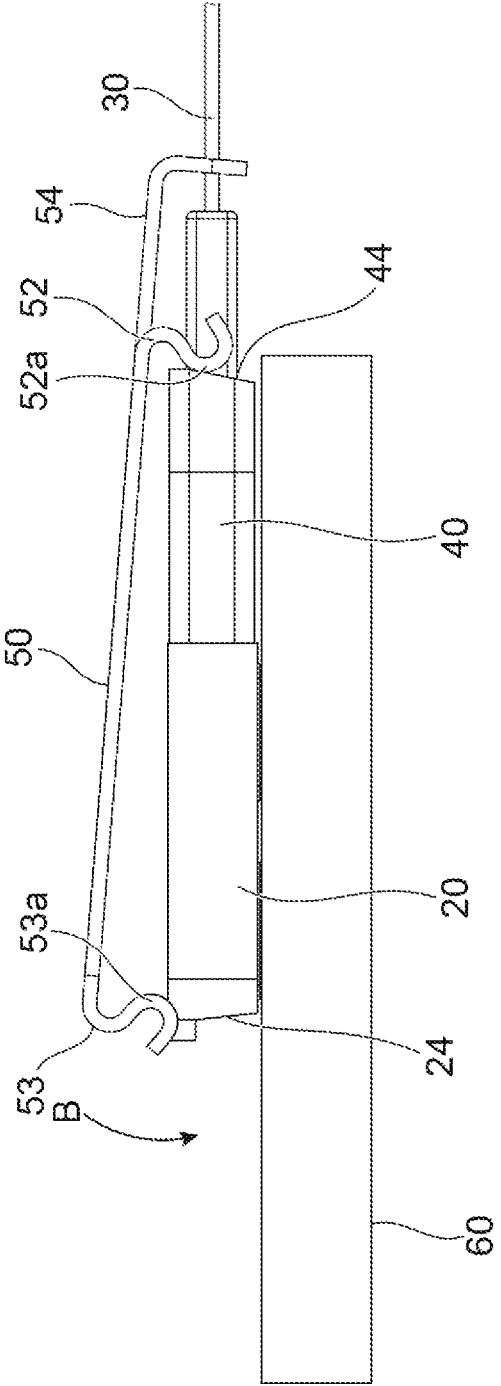
FIG. 9 is a diagram sequentially illustrating the method of connecting the optical connector module to the lens module following FIG. 7.

Subsequently, when the connecting member 50 is further rotated in the rotation direction B from a state in which the first elastic portions 52 of the connecting member 50 are in contact with the rear end surface 44 of the connector 40, as shown in FIG. 9, the second protruding portions 53a of the second elastic portions 53 of the connecting member 50 come into contact with the upper portion of the rear end surface 24 of the lens module 20. At this time, the first protruding portions 52a of the first elastic portions 52 slide and move from the upper portion of the rear end surface 44 of the connector 40 to the inclined surface. Since each of the first protruding portions 52a has a curved surface, such sliding movement can be performed smoothly.

Figure 10:
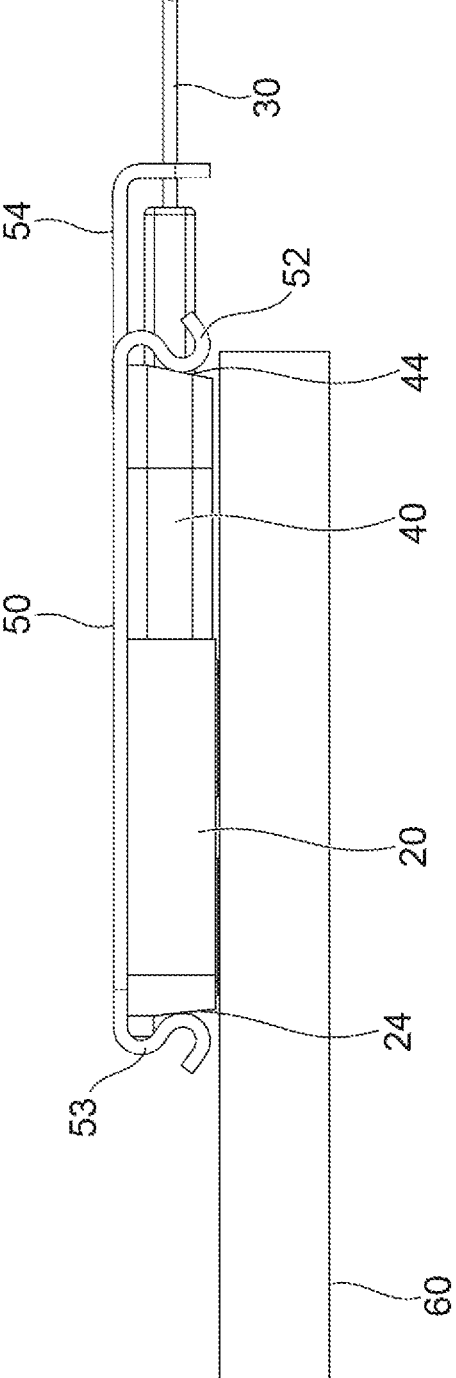
FIG. 10 is a view sequentially illustrating the method of connecting the optical connector module to the lens module following FIG. 9, and illustrates the state in which the optical connector module is coupled to the lens module.

Subsequently, when the connecting member 50 is further rotated from the state in which the second elastic portions 53 of the connecting member 50 are in contact with the lens module 20, as shown in FIG. 10, the first elastic portions 52 of the connecting member 50 move further to a lower portion of the inclined surface of the rear end surface 44 and are engaged with a predetermined portion of the rear end surface 44. Similarly, the second elastic portions 53 of the connecting member 50 move to a lower portion of the inclined surface of the rear end surface 24 of the lens module 20 and are engaged with a predetermined portion of the rear end surface 24. At this time, the second protruding portions 53a of the second elastic portions 53 slide and move from the upper portion of the rear end surface 24 of the lens module 20 to the inclined surface. Since each of the second protruding portions 53a has a curved surface, such sliding movement can be performed smoothly. Due to such engagement, a connected state in the connected body of the optical connector module 10 and the lens module 20 is reliably maintained by the connecting member 50. Since the connecting member 50 covers the optical connector module 10 and the lens module 20 from above, for example, the mirror surface 22 of the lens module and a window portion located above the connector 40 are covered and protected by the connecting member 50.

In the connecting member 50 of the optical connector module 10, due to a distance from the first plate portion 51 (the first end 51a) of the first protruding portion 52a of the first elastic portion 52, a distance from the first plate portion 51 (the second end 51b) of the second protruding portion 53a of the second elastic portion 53, a length of the first flat plate portion 55 of the second plate portion 54, a position of the edge 57a of the opening 57 in contact with the ribbon fiber cable 30, and a facing distance between the first protruding portion 52a and the second protruding portion 53a, or the like being adjusted, as described above, the second elastic portions 53 come into contact with the lens module 20 after the first elastic portions 52 come into contact with the connector 40, and the first elastic portions 52 and the second elastic portions 53 are engaged with the connector 40 and the lens module 20, respectively, by the rotation operation around the rotation axis C.

As described above, in the optical coupling structure 1 according to the present embodiment, the connecting member 50 is configured to rotate in contact with the connector 40 and to be engaged with each of the connector 40 and the lens module 20. Thus, when the connecting member 50 is attached to the connected body of the connector 40 and the lens module 20, the connecting member 50 first comes into contact with the connector 40 due to the rotation operation. Thus, it is avoided that the connecting member 50 is attached to both the connector 40 and the lens module 20 simultaneously, and the connecting member 50 can be attached to the connector 40 and the lens module 20 more easily. In addition, if the connecting member 50 is attached to both the connector and the lens module 20 simultaneously, a force that presses the connecting member 50 tends to increase, which may cause the connecting member 50 to be deformed. However, according to the optical coupling structure 1, the connecting member 50 is attached in order, and thus, the deformation of the connecting member 50 can be curbed.

In the optical coupling structure 1, the connecting member 50 includes the first plate portion 51, the first elastic portions 52 that are provided at the first end 51a of the first plate portion 51 and can be engaged with the connector 40, and the second elastic portions 53 that are provided at the second end 51b of the first plate portion 51 and can be engaged with the lens module 20. Each of the first elastic portions 52 includes the first protruding portion 52a protruding toward the second end 51b, and is configured to apply an elastic force toward the second end 51b to the first protruding portion 52a when the first protruding portions 52a are engaged with the connector 40. Thus, the connecting member can be more reliably engaged with each of the connector 40 and the lens module 20, and the connecting member 50 can be rotated around a region close to the first elastic portion 52.

In the optical coupling structure 1, each of the second elastic portions 53 includes the second protruding portion 53a protruding toward the first end 51a and is configured to apply an elastic force toward the first end 51a to the second protruding portion 53a when the second protruding portions 53a are engaged with the lens module 20. Thus, the second elastic portions 53 can be more reliably engaged with the lens module 20.

In the optical coupling structure 1, the connecting member 50 has the second plate portion 54 that extends further rearward from the first end 51a of the first plate portion 51. The second plate portion 54 includes the rotation axis C for the rotation operation of the connecting member 50. With such a configuration, engaging the connecting member 50 with each of the connector 40 and the lens module 20, and rotating the connecting member 50 can be performed as a series of operations, and the connecting member 50 can be more easily attached to the connected body of the connector 40 and the lens module 20.

In the optical coupling structure 1, the connecting member 50 is configured so that the second elastic portions 53 come into contact with the lens module 20 after the first elastic portions 52 come into contact with the connector 40 due to the rotation operation around the rotation axis C, and the first elastic portions 52 and the second elastic portions 53 are engaged with the connector 40 and the lens module 20, respectively. Thus, the connecting member 50 can be smoothly attached to the connected body of the connector 40 and the lens module 20.

In the optical coupling structure 1, the opening 57 is formed in the second plate portion 54, and the ribbon fiber cable 30 (the optical fiber(s)) is inserted through the opening 57. The connecting member 50 can be prevented from coining off by attaching the connecting member 50 to the ribbon fiber cable 30 in this way.

In the optical coupling structure 1, the second plate portion 54 includes the first flat plate portion 55 that extends in the connection direction A, and the second flat plate portion 56 that extends from the first flat plate portion 55 in a direction intersecting the connection direction A. The opening 57 is formed over the first flat plate portion 55 and the second flat plate portion 56. In this case, the rotation operation of the connecting member 50 can be easily set as desired by adjusting the length of the first flat plate portion 55 and the size or shape of the opening 57.

The pair of first elastic portions 52 are provided at the optical coupling structure 1, and the second plate portion 54 extends rearward from between the pair of first elastic portions 52. In this case, an operation of the first protruding portions 52a that come into contact with the connector 40 during the rotation operation and an operation of the second plate portion 54 that functions as the rotation axis C can be prevented from interfering with each other, and the rotation operation of the connecting member 50 can be performed smoothly. Thus, the connecting member 50 can be more easily attached to the connected body of the connector 40 and the lens module 20.

In the optical coupling structure 1, the connecting member 50 is configured to cover at least part of the lens module 20 with the first plate portion 51 when the state in which the connector 40 is connected to the lens module 20 is maintained. For example, the first plate portion 51 covers the mirror surface 22 of the lens module 20. Thus, in the lens module 20, it is possible to curb deterioration of the optical characteristics of the optical coupling structure due to foreign matter adhering to a region (for example, the mirror surface and the lens surface) to which foreign matter should not adhere.

In the optical coupling structure 1, the rear end surface 44 of the connector 40 includes a surface that is inclined toward the inside of the connector 40, and this inclined surface forms an angle of 5 to 30 degrees with respect to a plane orthogonal to the connection direction A. In this case, it is possible to prevent the connecting member 50 engaged with the connector 40 from unintentionally coining off due to an external impact.

In the optical coupling structure 1, the rear end surface 24 of the lens module 20 includes a surface that is inclined toward the inside of the lens module 20, and this inclined surface forms an angle of 5 to 30 degrees with respect to a plane orthogonal to the connection direction A. In this case, it is possible to prevent the connecting member 50 engaged with the lens module 20 from unintentionally coming off due to an external impact.

The connection method according to the present embodiment is a method for connecting the connector 40 to the lens module 20, and includes preparing the connecting member 50, rotating the connecting member 50 around the rotation axis C located in the second plate portion 54 so that the first elastic portions 52 come into contact with the connector 40, further rotating the connecting member 50 around the rotation axis C until the second elastic portions 53 come into contact with the lens module 20 after the first elastic portions 52 come into contact with the connector 40, and engaging the first elastic portions 52 with the connector and engaging the second elastic portions 53 with the lens module 20. According to the connecting method, due to the rotation operation, the second elastic portions 53 of the connecting member 50 come into contact with the lens module 20 after the first elastic portions 52 of the connecting member 50 come into contact with the connector 40, and the connecting member 50 is engaged with the connector 40 and the lens module 20. Thus, it is avoided that the connecting member 50 is attached to both the connector 40 and the lens module 20 simultaneously, and the connecting member 50 can be attached to the connector 40 and the lens module 20 more easily. Moreover, according to the connecting method, since the connecting member 50 is mounted in order, the deformation of the connecting member 50 can be curbed.

Second Embodiment

Figure 11:
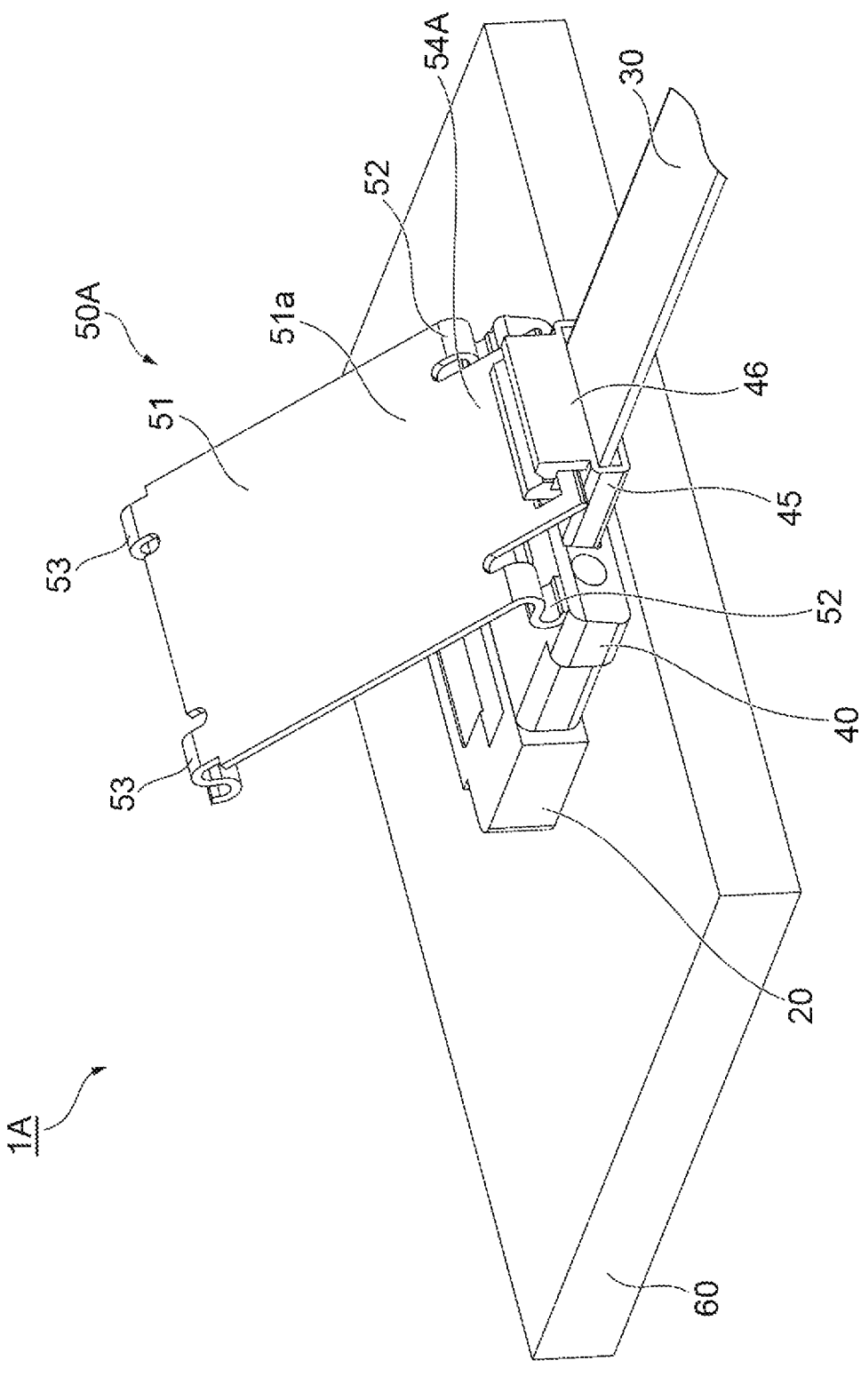
FIG. 11 is a perspective view illustrating an optical coupling structure according to a second embodiment.
Figure 12:
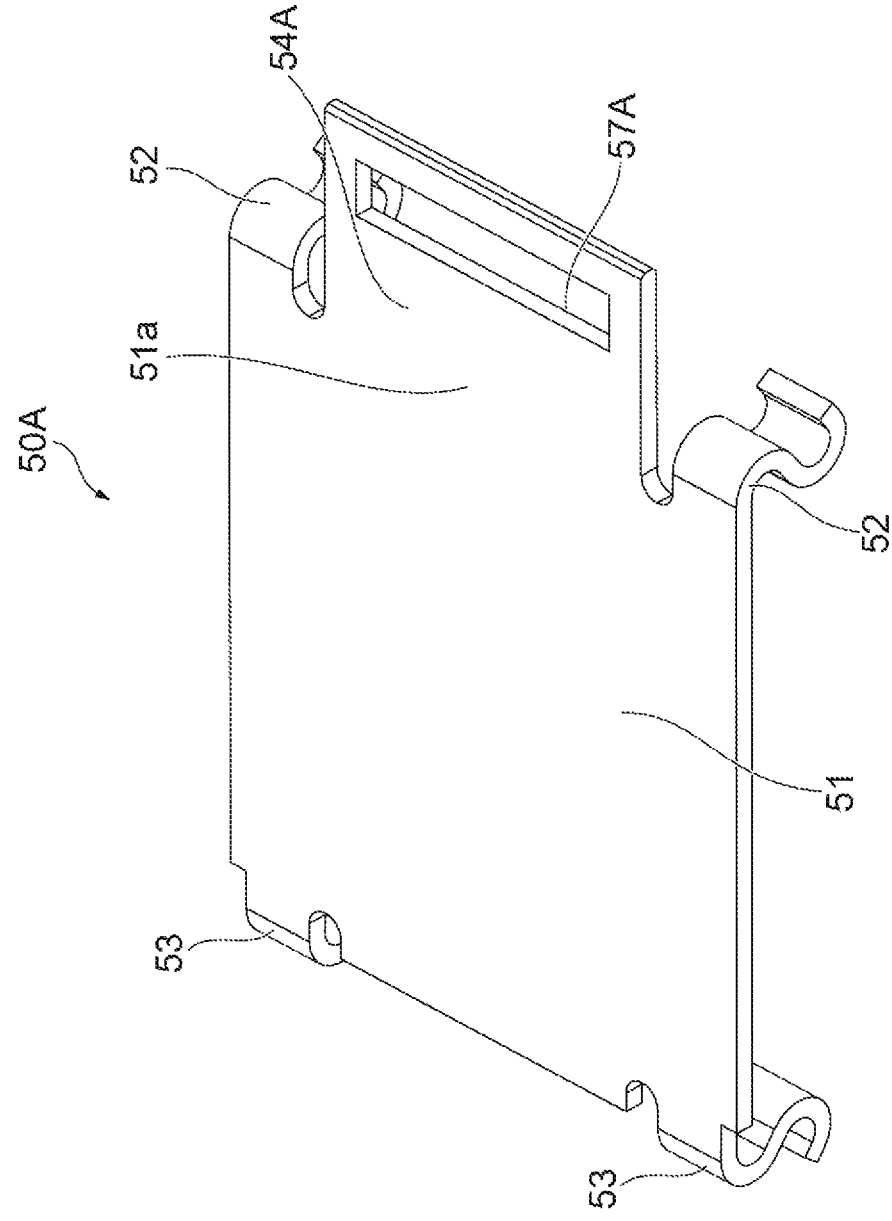
FIG. 12 is a top perspective view of a connecting member of an optical connector module used in the optical coupling structure shown in FIG. 11.
Figure 13:
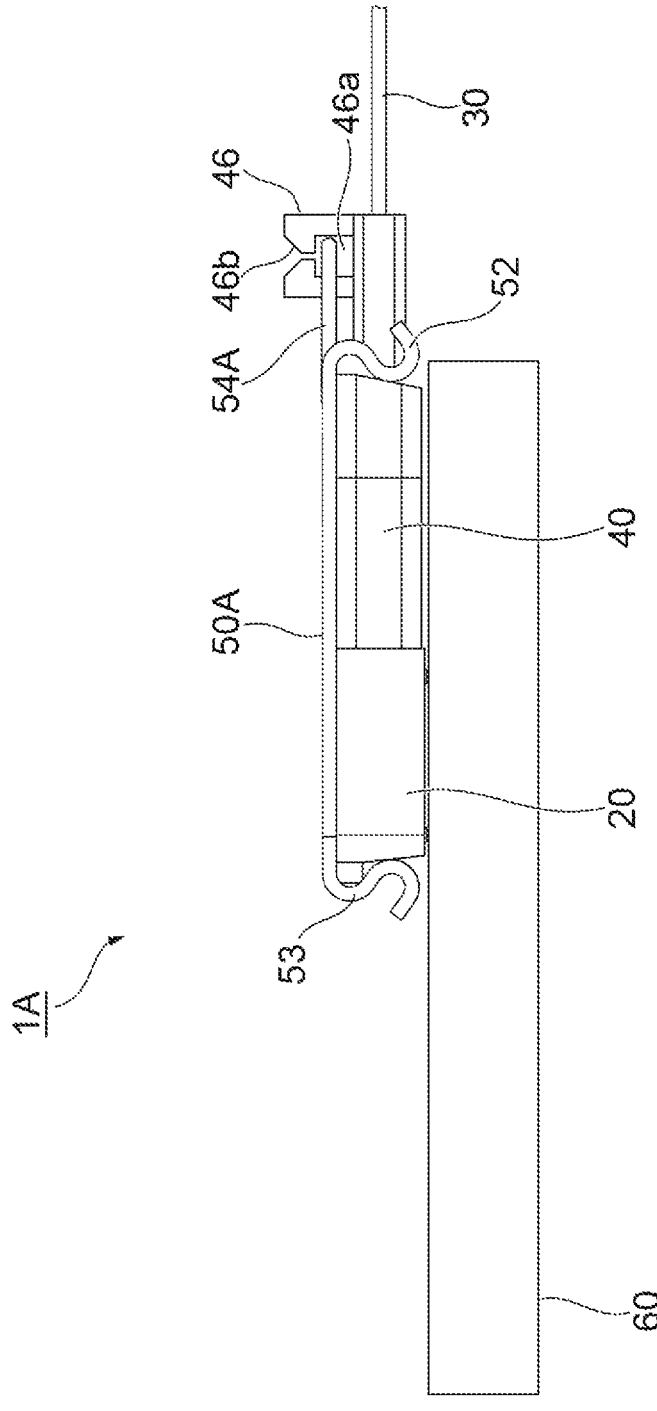
FIG. 13 is a side view illustrating a state in which the optical connector module is coupled to the lens module in the optical coupling structure shown in FIG. 11.

Next, an optical coupling structure 1A according to a second embodiment will be described with reference to FIGS. 11, 12 and 13. FIG. 11 is a perspective view illustrating the optical coupling structure according to the second embodiment. FIG. 12 is a perspective view of a connecting member of an optical connector module used in the optical coupling structure shown in FIG. 11 when seen from above. FIG. 13 is a side view illustrating a state in which the optical connector module is coupled to the lens module in the optical coupling structure shown in FIG. 11. In the following, differences from the optical coupling structure 1 according to the first embodiment are mainly described, and other descriptions may be omitted.

As shown in FIG. 11, the optical coupling structure 1A includes an optical connector module 10A and the lens module 20. The optical connector module 10A includes the ribbon fiber cable 30, the connector a boot 45, and a connecting member 50A. The optical connector module 10A is different from the optical connector module 10 according to the first embodiment in the configuration of the boot 45 and the connecting member 50A. In the boot 45 according to the second embodiment, a rotation support 46 is provided behind the center. The rotation support 46 is a member that is configured of a pair of walls facing each other and rotatably supports one end of the connecting member 50A. The rotation support 46 functions as a rotation axis when the connecting member 50A performs the rotation operation with respect to the connector 40 and the like. Other configurations are the same.

The connecting member 50A includes the first plate portion 51, the pair of first elastic portions 52, the pair of second elastic portions 53, and a second plate portion 54A. The second plate portion 54A protrudes rearward from the first end 51a of the first plate portion 51 in the same manner as in the second plate portion 54. On the other hand, the second plate portion 54A has only a flat portion that extends in the connection direction A and is not bent into an L shape or the like. An opening 57A is provided in the rear of the second plate portion 54A. The opening 57A is similar to the opening 57 of the first embodiment in that it is provided in the second plate portion, but is different in that the optical fibers are not inserted through the opening 57A when the connecting member 50A is attached. As shown in FIG. 13, a peripheral wall portion that constitutes the opening 57A according to the second embodiment is attached to the rotation support 46 provided on the boot 45, and the peripheral wall portion that constitutes the opening 57A is inserted into a shaft hole 46a of the rotation support 46 through an insertion port 46b. Thus, the connecting member 50A is configured to rotate around a region of the shaft hole 46a. Since the rotation operation by the connecting member 50A is the same as in the first embodiment, the explanation thereof will be omitted.

Figure 14:
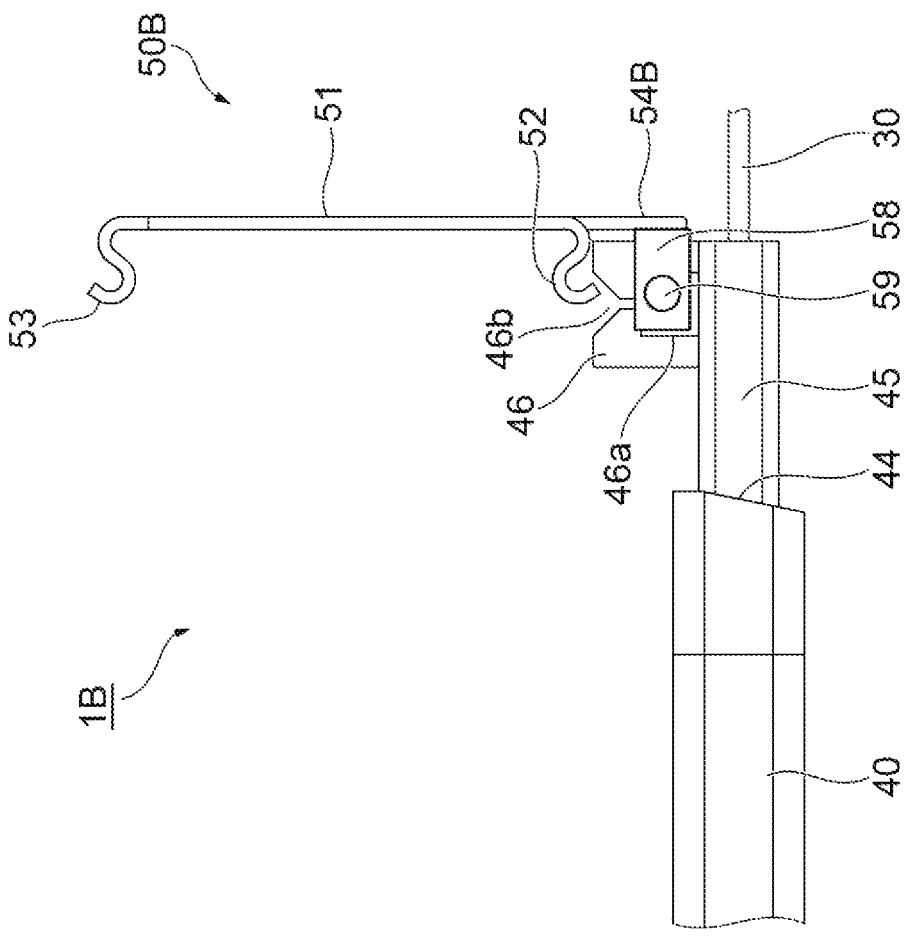
FIG. 14 is a diagram illustrating a modified example of the optical coupling structure according to the second embodiment.

An optical coupling structure according to the second embodiment can be modified to an optical coupling structure 1B configured as shown in FIG. 14. In the optical coupling structure 1B, a connecting member 50B includes a second plate portion 54B, a shaft support 58 attached to the second plate portion 54B, and a rotation shaft 59 attached to the shaft support 58, in addition to the first plate portion 51, the pair of first elastic portions 52, and the pair of second elastic portions 53. The shaft support 58 is formed of a sheet metal or the like, and has a shape that extends to both ends of the rotation support 46 in a direction orthogonal to the connection direction A (a direction orthogonal to a surface of the drawing) and extends forward in the connection direction A from the both ends. A rod-shaped rotation shaft 59 is supported from both ends by the shaft support 58, and the connecting member 50B rotates around the shaft hole 46a by locating the rotation shaft 59 in the shaft hole 46a of the rotation support 46. The connecting member may have such a rotating structure.

As described above, according to the optical coupling structures 1A and 1B according to the present embodiment (including the modified example), the same effects as in the optical coupling structure 1 according to the first embodiment can be obtained. In addition, since the rotation support 46 is provided at the boot 45 in the optical coupling structures 1A and 1B, the connecting members 50A and 50B can be easily removed when the connecting members 50A and 50B are replaced. That is, since the optical fibers are not inserted through the connecting member in the optical coupling structure according to the second embodiment, it is possible to easily replace the connecting member when it is necessary to replace it due to a failure or the like. In addition, since the connecting members 50A and 50B can be prevented from coining into contact with the optical fibers when the connecting members 50A and 50B are rotated, it is possible to curb disconnection of the optical fibers.

Figure 15:
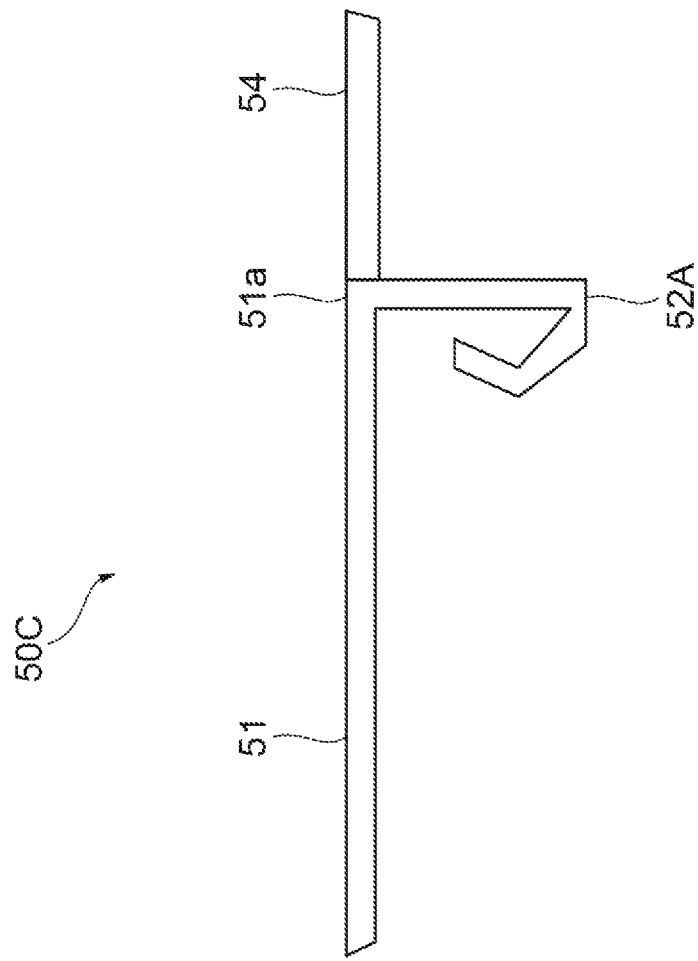
FIG. 15 is a diagram illustrating another modified example of the connecting member of the optical connector module.

Although the embodiments of the present disclosure have been described in detail above, the present invention is not limited to the above-described embodiments and can be applied to various embodiments. For example, in the above-described embodiments, the lens module was exemplified as an optical component connected to the optical connector module, but the invention is not limited thereto. For example, another optical connector module may be used as an optical component connected to the optical connector module 10. Although the MT connector is exemplified as the connector used in the optical connector module 10, other types of connectors may be used. Moreover, although the configuration of the S shape was exemplified as the shape of the first elastic portion 52 of the optical connector module it is not limited thereto. For example, as shown in FIG. 15, a first elastic portion 52A having a linear portion that extends downward from the first end 51a of the first plate portion 51 and a protruding portion that extends obliquely upward from the linear portion may be used. In this configuration, the linear portion functions as a spring and can apply an elastic force to the protruding portion. Each of the second elastic portions 53 of the optical connector module may have a shape shown in FIG. 15.

What is claimed is:

1. An optical coupling structure comprising:
an optical component; and
an optical connector module connected to the optical component, the optical connector module comprising:
at least one optical fiber;
a connector that holds the optical fiber, the connector being configured to be connected to the optical component in a first direction; and
a connecting member configured to maintain a connected state between the connector and the optical component when the connector is connected to the optical component, wherein:
the connecting member is configured to rotate in contact with the connector and to be engaged with each of the connector and the optical component,
the connecting member includes a hole through which the optical fiber passes through, and the hole is a perforation on the connecting member such that all surrounding of the perforation is closed by the connecting member, and
a surface of a rear end of the connector is a first inclined surface that is inclined toward an inside of the connector, or a surface of a rear end of the optical component is a second inclined surface that is inclined toward an inside of the optical component.

2. The optical coupling structure according to claim 1, wherein:
the connecting member includes a first plate portion, a first elastic portion provided at a first end of the first plate portion and configured to be engaged with the connector, and a second elastic portion provided at a second end opposite to the first end of the first plate portion and configured to be engaged with the optical component; and
the first elastic portion includes a first protruding portion that protrudes toward the second end, and is configured to apply an elastic force toward the second end to the first protruding portion when the first protruding portion is engaged with the connector.

3. The optical coupling structure according to claim 2, wherein the second elastic portion includes a second protruding portion that protrudes toward the first end, and is configured to apply an elastic force toward the first end to the second protruding portion when the second protruding portion is engaged with the optical component.

4. The optical coupling structure according to claim 2, wherein:
the connecting member includes a second plate portion that extends further rearward from the first end of the first plate portion; and
the second plate portion includes a rotation axis for a rotation operation of the connecting member.

5. The optical coupling structure according to claim 4, wherein
the connecting member is configured so that, due to a rotation operation around the rotation axis, the second elastic portion comes into contact with the optical component after the first elastic portion comes into contact with the connector, and the first elastic portion and the second elastic portion are engaged with the connector and the optical component, respectively.

6. The optical coupling structure according to claim 4, wherein:
the hole, through which the optical fiber passes through, is formed in the second plate portion.

7. The optical coupling structure according to claim 6, wherein:
the second plate portion includes a first flat plate portion that extends in the first direction and a second flat plate portion that extends orthogonally from the first flat plate portion; and
the hole is formed over both the first flat plate portion and the second flat plate portion.

8. The optical coupling structure according to claim 4, wherein:
the first elastic portion includes a pair of first elastic structures each including the first protruding portion; and
the second plate portion extends rearward from between the pair of first elastic structures.

9. The optical coupling structure according to claim 2, wherein the connecting member is configured to cover at least part of the optical component with the first plate portion when a state in which the connector is connected to the optical component is maintained.

10. The optical coupling structure according to claim 1, wherein:
surface of the rear end of the connector is the first inclined surface that is inclined toward the inside of the connector; and
the first inclined surface forms an angle of 5 degrees to 30 degrees with respect to a plane orthogonal to the first direction.

11. The optical coupling structure according to claim 1, further comprising:

a boot attached to the connector and configured to protect the optical fiber; and a rotation support provided at the boot and configured to rotatably support the connecting member.

12. The optical coupling structure according to claim 2, wherein the first protruding portion includes a curved surface.

13. The optical coupling structure according to claim 2, wherein the first elastic portion extends downward from the first plate portion and is curved to have a S-shape on a side view.

14. The optical coupling structure according to claim 3, wherein the second protruding portion includes a curved surface.

15. The optical coupling structure according to claim 14, wherein the first protruding portion includes a curved surface, and the curved surface of the first protruding portion and the curved surface of the second protruding portion face each other in the first direction.

16. The optical coupling structure according to claim 1, wherein:

the surface of the rear end of the optical component is the second inclined surface that is inclined toward the inside of the optical component; and the second inclined surface forms an angle of 5 degrees to 30 degrees with respect to a plane orthogonal to the first direction.

17. A method of connecting a connector to an optical component, comprising:

preparing a connecting member including:

a first plate portion, a first elastic portion provided at a first end of the first plate portion, the first elastic portion being configured to be engaged with the connector, a second elastic portion provided at a second end opposite to the first end of the first plate portion, the second elastic portion being configured to be engaged with the optical component, a second plate portion that extends from the first end of the first plate portion, and a hole through which an optical fiber held by the connector passes through, the hole being a perforation formed on the connecting member such that all surrounding of the perforation is closed by the connecting member, wherein:

the first elastic portion includes a first protruding portion that protrudes toward the second end, and the first protruding portion is configured to apply an elastic force toward the second end, and the second elastic portion includes a second protruding portion that protrudes toward the first end, and the second protruding portion is configured to apply an elastic force toward the first end;

rotating the connecting member around a rotation axis located in the second plate so that the first protruding portion comes into contact with the connector;

further rotating the connecting member around the rotation axis until the second protruding portion comes into contact with the optical component after the first protruding portion contacts the connector; and engaging the first elastic portion with the connector and engaging the second elastic portion with the optical component, wherein a surface of a rear end of the connector is a first inclined surface that is inclined toward an inside of the connector, or a surface of a rear end of the optical component is a second inclined surface that is inclined toward an inside of the optical component.

18. The method according to claim 17, wherein the first protruding portion includes a curved surface having a S-shape on a side view and the second protruding portion includes a curved surface having a S-shape on a side view.

19. The optical coupling structure according to claim 1, wherein the surface of the rear end of the connector is the first inclined surface, and the surface of the rear end of the optical component is the second inclined surface.

* * * * *